US011044919B2

(12) United States Patent
Charm et al.

(10) Patent No.: US 11,044,919 B2
(45) Date of Patent: *Jun. 29, 2021

(54) DELIVERY APPARATUS TO DELIVER A HIDDEN ITEM INSIDE A FOOD

(71) Applicant: Charm Concepts, LLC, Newton, MA (US)

(72) Inventors: Elizabeth M. Charm, Newton, MA (US); Jovo Djuragic, Medford, MA (US); Jordan Long, Newton, MA (US)

(73) Assignee: Charm Concepts, LLC, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,614

(22) Filed: Mar. 4, 2020

(65) Prior Publication Data

US 2020/0315189 A1 Oct. 8, 2020

Related U.S. Application Data

(63) Continuation of application No. 15/769,546, filed as application No. PCT/US2017/059471 on Nov. 1, 2017, now Pat. No. 10,624,357.

(60) Provisional application No. 62/415,950, filed on Nov. 1, 2016, provisional application No. 62/547,338, filed on Aug. 18, 2017, provisional application No. 62/557,826, filed on Sep. 13, 2017.

(51) Int. Cl.
*A21D 13/48* (2017.01)
*A23G 3/50* (2006.01)

(52) U.S. Cl.
CPC .............. *A21D 13/48* (2017.01); *A23G 3/50* (2013.01)

(58) Field of Classification Search
None
See application file for complete search history.

(56) References Cited

U.S. PATENT DOCUMENTS

| | | | | | |
|---|---|---|---|---|---|
| 2,347,041 | A | * | 4/1944 | Filsinger | B44F 11/00 312/204 |
| 3,843,220 | A | * | 10/1974 | Snider | B65D 71/00 312/204 |
| 5,518,746 | A | * | 5/1996 | Diaz | A23G 3/0268 426/138 |
| 7,021,465 | B1 | * | 4/2006 | McGuigan | A47G 19/00 206/457 |
| D719,479 | S | * | 12/2014 | OKeefe-Galasso | D11/136 |
| 10,624,357 | B2 | * | 4/2020 | Charm | B65D 85/60 |
| 2003/0152659 | A1 | * | 8/2003 | McCloskey | A63H 33/001 425/256 |
| 2009/0181134 | A1 | * | 7/2009 | Lefevre | A21D 13/47 426/113 |
| 2010/0080871 | A1 | * | 4/2010 | Doty | A23G 3/50 426/87 |
| 2017/0086608 | A1 | * | 3/2017 | Butler | A47G 19/00 |

* cited by examiner

*Primary Examiner* — Monica E Millner
(74) *Attorney, Agent, or Firm* — MacCord Mason PLLC

(57) ABSTRACT

Delivery apparatus and assemblies are shown and described. In one embodiment, a delivery apparatus includes a container adapted to support the concealed article, a central tube, and a release mechanism. The release mechanism may release the container from the central tube and protrude through the exposed end. The result is an improved hidden display and assembly for enhancing efficient, effective delivery of a hidden item inside a food item(s) or the like.

20 Claims, 13 Drawing Sheets

DELIVERY APPARATUS TO DELIVER A HIDDEN ITEM INSIDE A FOOD

RELATED APPLICATIONS

This application is a Continuation of U.S. application Ser. No. 15/769,546, filed Apr. 19, 2018, which claims priority to PCT/US2017/59471, filed Nov. 1, 2017; U.S. provisional application 62/415,950, filed Nov. 1, 2016; U.S. provisional application 62/547,338, filed Aug. 18, 2017; and U.S. provisional application 62/557,826, filed Sep. 13, 2017, all of which are incorporated herein by reference in their entireties.

FIELD

The inventions relate to an apparatus for delivering a hidden gift to a recipient inside a cake or other food item.

BACKGROUND

Marking a special occasion, such as a birthday, wedding or holiday, with food and gift giving are age old traditions. In some cultures, special occasion foods and gifts have been enhanced by hiding small trinkets, candies, or more unique gift items inside a prepared food, such as cake, prior to serving so that the gift is a surprise to the recipient. One prior method has been to mix gift items into cake batter prior to baking, but the gift is then exposed to high heat and moisture during baking. Thus, another method is to remove the cake from its pan after baking, and then turn the cake upside down to manually insert the gift item into the cake from the bottom. However, the cake is at risk of being damaged, so that the cake has a less appealing appearance when displayed for the special occasion. Another disadvantage of both of the aforementioned methods is that the gift could be damaged by a knife or other like instrument when cutting or serving portions of the food.

One example of such a special occasion food item is the King Cake, which is popular in New Orleans, France, Belgium and other parts of the world between January $6^{th}$ (Twelfth Night or the Epiphany) and Mardi Gras, the last day before Lent. A King Cake is a baked confection or pastry having a trinket baked inside of it, and the finder of the trinket is anointed "king" for the forthcoming year. Historically, trinkets have routinely been non-food items such as a plastic or ceramic or porcelain trinkets, sometimes in the shape of a doll. But the difficulty with hiding an inedible surprise into a cake is that the finder could choke on the item, or could damage a tooth. So to avoid that danger, bakeries in the United States have been selling King Cakes without any trinkets, or by providing the trinket separately, outside and alongside of the cake.

In the United States, the Federal Food, Drug, and Cosmetics Act prohibits the manufacture or introduction or delivery into interstate commerce of an adulterated food. 21 U.S.C. § 331. A food is deemed to be adulterated if it is a confectionery and has partially or completely imbedded within it a non-nutritive object, unless the US Food and Drug Administration (FDA) has issued a regulation recognizing that the non-nutritive object is of practical functional value to the confectionery product and would not render the product injurious or hazardous to health. 21 U.S.C. § 342 (d)(1). Import Alert 34-02 was issued by the FDA when it became "aware of a product called "Kinder Surprise Eggs", and similar articles containing imbedded, non-nutritive objects, being offered for sale in the United States. The imbedded non-nutritive objects in these confectionary products were considered to pose a public health risk as the consumer may unknowingly choke on the object." Import Alert 34-02. Based on the Import Alert, FDA field personnel are instructed to detain import of any such adulterated foods without physical examination. Id.

SUMMARY

Accordingly, the inventions feature a method and apparatuses for hiding a surprise non-edible gift item in a cake or other confectionery, so that the gift will be a surprise to the recipient, while at the same time making it impossible for anyone to choke, bite down on, or otherwise ingest the gift. The food item can be sold to consumers as a non-adulterated food, in compliance with the food safety regulations of the U.S. Food and Drug Administration.

In one embodiment of the present disclosure, a plate foundation for delivery of a concealed article through an item includes a base; a container having a first diameter and adapted to support the concealed article in an engaged position; a central tube extending from the base and having a lower portion and an exposed open end with a diameter greater than the container's diameter, wherein the container traverses a length of the central tube; and a release mechanism aligned on the base and adapted to release the container from the central tube's lower portion and protrude through the exposed upper end, and wherein the container delivers the concealed article from an isolated position substantially parallel with the food item to an adjacent display position.

In certain examples, the apparatus includes at least one aperture within the base. Further, the container may comprise an engagement device, for instance a magnet, engagement slot, or the like adapted to mate with an opposing engagement device. In some examples, the engagement device is generally housed within the central tube. The apparatus may include a variable height securement device, for instance a square cross-section O-ring.

In another embodiment of the disclosure, an apparatus for delivery of a concealed article through an item includes a plate foundation, a board assembly, and a release mechanism. Typically, the plate foundation includes a central tube with an exposed upper open end, a container portable about the central tube. The board assembly mates with the plate foundation in an assembled position and typically includes a board member with a top face adapted to receive the item and an interior hole adapted to receive the central tube, and an elongation housing extending upward from the interior hole and surrounding the central tube in the assembled position. The release mechanism releases the container from the apparatus.

In certain examples, the release mechanism includes a retractable spring plunger and a rotating shaft box. Further, a split key ring connects the retractable spring plunger about the rotating shaft box. The board assembly may be repositionable along a height of the central tube. The apparatus may include a foundation base. In addition, the apparatus may include a securement device for multi-height positioning. The securement device may comprise a collar having a locking mechanism. The securement device may be an O-ring. Further, the board assembly may include a removable exterior wall, for instance a baking cylinder or the like. The container may comprise an engagement device, for instance a magnet, engagement slot, or the like adapted to mate with an opposing engagement device.

In yet another embodiment of the disclosure, an assembly to support a plurality of food items to deliver a concealed article adjacent the food items includes a container supporting the concealed articles in an engaged first position; a central tube having an exposed open end and adapted to conceal the container in the engaged first position; a board member having a securement fastener adapted to fasten at least one food item; and a release mechanism adapted to release the container from within the central tube beyond the plurality of food items.

In certain examples, the securement fastener is an adhesive, a hook, a J-hook, a magnet, a linkage, a combination thereof, or the like. Further, the release mechanism may include a retractable spring plunger and a rotating shaft box.

In certain examples, the release mechanism includes a retractable spring plunger and a rotating shaft box. A split key ring may connect the retractable spring plunger about the rotating shaft box. The release mechanism may comprise an ejection mechanism for ejecting the article from the central tube. The board assembly may be repositionable along a height of the central tube. For instance, a securement device may secure the board assembly in a semi-fixed height position about the central tube. The securement device may comprise a collar having a locking mechanism, for example the securement device may include an O-ring. The plate foundation may comprise a tube cover for releasably covering the open end of the tube. The board assembly may comprise a removable exterior wall, for instance, the removable exterior wall may be a baking cylinder or the like.

In another embodiment, a plate foundation to deliver a concealed article through an adjacent food item includes a base; a central tube extending from the base and having an exposed upper open end and a repositionable platform; and a conical spring engaging the repositionable platform to protrude the platform about the central tube in an operation delivery position.

In certain examples, the plate foundation includes at least one aperture within the base. The aperture may comprise a mechanical closure to alter a diameter of the aperture to correspond to a predetermined delivery load, speed, and/or acceleration. Further, the aperture may comprise a variable height securement device, for instance a square cross-section O-ring.

In another embodiment, an assembly to support a plurality of food items and mate with an apparatus to deliver a concealed article adjacent the food items includes a board member having a securement fastener to fasten at least one food item, a bottom face, and an interior hole; an elongation housing extending upward from the interior hole; and a removable cap.

In particular examples, the assembly includes a removable exterior baking wall. Further, the securement fastener may be an adhesive, a hook, a J-hook, a magnet, a linkage, a combination thereof, and the like.

Various embodiments feature a food apparatus for concealing an item therein. The apparatus is preferably a cake plate, but can also be a "plate", as used herein, as one or more of, as the case may be, cake pans; cake plates; cake molds; cupcake molds; cake supports, cake rests; cake stands; and cake rings.

A "food item", as used herein, is any edible item suitable for concealing a non-edible item according to the methods and using the apparatuses. Suitable food items include, without limitation, bakery goods, namely, cakes, cupcakes, cookies, brownies, muffins, pies, scones, and confections. Therefore, any of the apparatus and assemblies herein may be useful for preparing a food item that conceals a non-edible item while being fully in compliance with safety regulations of the United States Food and Drug Administration.

A "concealed item", e.g., a "gift item", as used herein, can be, by way of example, an edible item or a non-edible item, such as a trinket, a candy, a gift card, or a medium contained a recorded message. By "concealed item" is meant that the presence of the item is not apparent from outside the finished food/apparatus assembly prior to release from the device by the recipient or user. Within the context, a concealed food item, although inside the food item, is non-integral with that food-item, and its presence is made apparent to the user before or during the process of first serving a portion of the food item and before ingestion by an eater, so that there is no danger that the item will cause injury to the health of the eater.

In additional embodiments, an apparatus for delivery a concealed article from an item includes a plate foundation, a board assembly, and a release mechanism. The plate foundation may include a central tube with an exposed upper open end, a base supporting the central tube, a platform repositionable about the central tube and having an upper face and a lower face, and a collar to secure the platform in a semi-fixed position about the central tube. The board assembly typically mates with the plate foundation and includes a board member with a top face to receive the item, a bottom face aligned with the platform's upper face, and an interior hole to receive the central tube, and an elongation housing extending upward from the interior hole and surrounding the central tube in an assembled position. The release mechanism typically releases the concealed article from the apparatus.

In some embodiments, the release mechanism includes a retractable spring plunger and a rotating shaft box. In certain examples, a linear motion conversion connects the retractable spring plunger and the rotating shaft box. The release mechanism may include an ejection mechanism for ejecting the article from the central tube. The platform may be repositionable along a height of the central tube. The collar may include a locking mechanism. Further, the plate foundation may include a tube cover for releasably covering the open end of the tube.

In certain examples, the board assembly may include a removable cap. The board assembly may be adapted to support a food item. For instance, the platform may include a disk-shaped platform adapted to support a substantially round food item. The board assembly may include a removable exterior wall. In particular examples, the removable exterior wall is a baking cylinder. The assembly may include a container for holding the concealed article and sized to fit within the central tube.

In still further embodiments, a plate foundation to support a food item and deliver a concealed article from the food item includes a lower base; a central tube extending from the base and having an exposed upper open end; and a variable height platform secured about the central tube with a collar.

In certain examples, the base includes a securement device. The collar may include a lower body surrounding the central tube. Further, the collar may include an upper body aligned with the platform. The foundation may include a spring release mechanism.

In another embodiment, an assembly to support a food item and mate with an apparatus to deliver a concealed article from the food item includes a board member having a top face adapted to receive the item, a bottom face, and an interior hole; an elongation housing extending upward from the interior hole; and a removable cap.

In some embodiments of the disclosure, a tube cover for releasably covering the second open end of the tube. Depending on which embodiment is applied, the tube cover can serve to support and be a foundation for applying a layer of, e.g., icing or frosting to the surface of the food item, e.g., frosting on a cake. In some of the same or in alternative embodiments, the tube cover can serve to conceal the hidden gift pod (a.k.a. container) from the eyes of a recipient of the food item, so that any, concealed item, e.g., gift item, inside the container remains a surprise to the recipient.

In another embodiment, the apparatus features a plate, e.g., a cake plate, which is integral with the base and includes an upper surface of the base.

In yet another embodiment of the present disclosure, the apparatus includes a release mechanism, the release mechanism further including a spring sized to fit within the tube and to be disposed between the base and the container; a securing element to hold the spring in a compressed state; and an actuator for transferring a release operative action by a user exterior to the base to the securing element in order to remove the securing element to release the spring. Without limitation, this apparatus can further include a passageway extending across and below the container, wherein the securing element further includes a moveable element to extend across the passageway to hold the spring in the compressed state, and wherein the actuator further includes an outer element extending through a surface of the base to receive the release operative action by the user, and a connector extending between the outer element and the securing element to transfer the release operative action from the outer element to the securing element in order to remove the securing element from the passageway.

It is yet a further embodiment of the disclosure that the outer element, the securing element, and the connector are integral and include a rod extendable from the exterior of the base to across the passageway.

It is yet a further embodiment of the disclosure that the outer element includes a first rod extending from an exterior of the base; wherein the securing element includes a second rod extendable across the passageway, and wherein the connector is pivotally connected to the first rod at one end and to the second rod at its other end.

It is yet a further embodiment of the disclosure that the actuator further includes a hold actuator for transferring a hold operative action by the user to the securing element in order to cause the securing element to hold the spring in the compressed state.

It is yet still further an embodiment of the disclosure that the release mechanism can further include a passageway across and below the container; wherein the securing element further includes a moveable element to extend across the passageway to hold the spring in the compressed state, and wherein the actuator further includes an outer element extending through a surface of the base to receive the hold operative action by the user, and a connector extending between the outer element and the securing element to transfer the hold operative action from the outer element to the securing element in order to extend the securing element across the passageway.

In yet another embodiment of the disclosure, the apparatus can further include a passageway extending across and below the container; wherein the container has a compartment for holding the concealed item; wherein the release mechanism further includes a spring sized to fit within the tube and to dispose between the base and the container; an actuator having an outer element extending through a surface of the base to receive a hold operative action by a user, a securing element positioned to extend across the passageway to hold the spring in a compressed state, and a connector extending between the outer element and the securing element to transfer the hold operative action from the outer element to the securing element in order to extend the securing element across the passageway.

In yet another embodiment of the disclosure, the apparatus can further include a spring sized to fit within the tube and to dispose between the base and the container; and a securing element to maintain the spring in a compressed state when the securing element is disposed above the spring, and to release the spring when the securing element is removed from above the spring. In some embodiments of the apparatus the base has a bottom spring seat for holding a bottom end of the spring, the bottom spring seat having a first hole there through; further including an upper spring seat for receiving an upper end of the spring, the spring seat positioned below the container and having a second hole for defining a passageway across the upper spring seat and for pairing with the first hole in the bottom spring seat when the spring is compressed; wherein the securing element is sized to pass through the first hole and the second hole, to extend across the passageway to maintain the spring in the compressed state, and to release the spring when the securing element is removed from the passageway.

In yet another embodiment, the upper spring seat further has a third hole to further define the passageway; wherein the bottom spring seat further has a fourth hole to pair with the third hole and to further define the passageway; and wherein the securing element is sized to pass through the first hole, the second hole, the third hole, and the fourth hole.

In still yet another embodiment, the apparatus of the outer element includes a button affixed to the connector.

In still yet another embodiment, the apparatus of the outer element includes a turnable knob having a first turning direction to effectuate the hold operative action and a second turning direction to effectuate the release operative action.

In still yet another embodiment, the apparatus of the disclosure has a release mechanism which includes an ejection mechanism for ejecting the container from the tube.

The apparatus of the disclosure may be useful for performing a method whereby a concealed item is delivered as an article to a recipient inside a food item, the method including concealing the article in a tube inside a food item on a stand; releasably holding the article within the tube; and applying a force to the stand to simultaneously release the hold on the article and move the article through the tube to an upper surface of the food item.

The method can further include moving the article through the tube to an upper surface of the food item, whereby the concealed item is ejected from the food item by the releasing mechanism.

All of the above processes are especially desirable for application in a special method of gifting, characterized in that the recipient of the gift experiences a high degree of surprise when discovering the concealed item. This method of gifting includes concealing the gift in a tube inside a food item on a food item stand, e.g., a cake stand; releasably holding the gift within the tube; and applying a force to the stand to simultaneously release the hold on the gift and move the gift through the tube to an upper surface of the food item.

Another embodiment of the disclosure is a method of preparing a food item containing a concealed item in a manner that is in compliance with regulations of the Food and Drug Administration, including concealing an article in a tube inside the food item on a stand; and releasably holding the article within the tube, further including holding the article above a compressed spring arranged to release and move the gift through the tube to an upper surface of the food item upon application of a force to the stand.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

Figure 1:
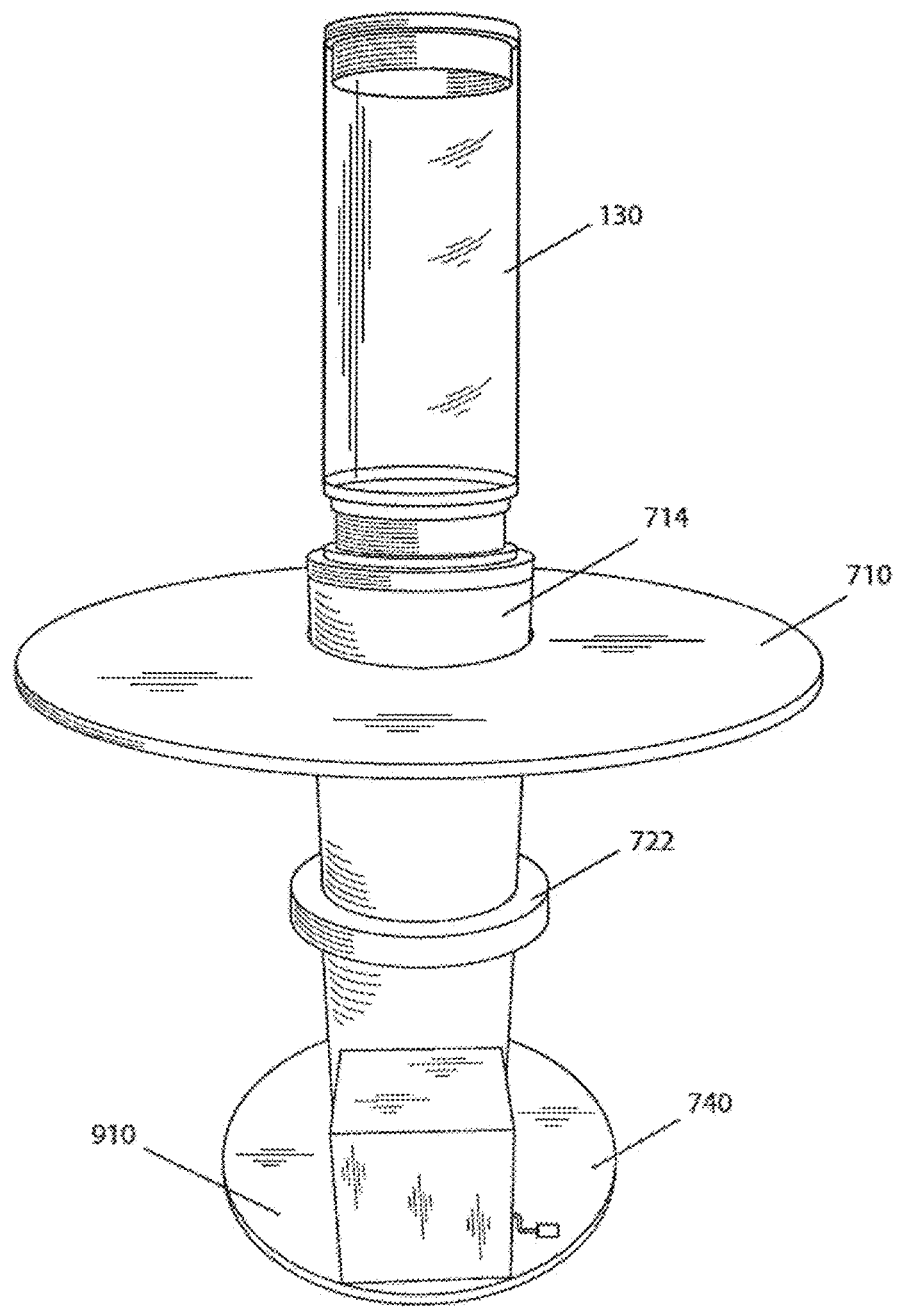
FIG. 1 is a perspective, exploded view of one embodiment of an apparatus for delivering a concealed item, such as a hidden gift, to a recipient inside a cake or other food item.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms. The present disclosure features a method of hiding a surprise item in a cake or other confectionery, so that the gift will be a surprise to the recipient, while at the same time making it impossible for one to choke, bite down on, or otherwise ingest the gift unawares. This is achieved by enclosing the surprise item within a container, a.k.a. gift pod, which is inserted into the center of the food, and concealed by a cover or decorations or both until such time as the recipient, server, eater, or other user, reveals the presence of the pod by releasing the pod at least partially, or even completely, from the food item. The gift pod container can have opaque walls to further conceal the identity of the item inside. Alternatively, one or more, or all, of the outer surfaces of the gift pod container are translucent or transparent. The gift pod can have its own bottom wall so as to be enclosed on the bottom of the container, or can be assembled while packaging the item into the gift pod container. The apparatuses and mechanisms herein apply to containers formed either prior to or during assembly of the gift pod container in the device.

The food item can be sold to consumers as a non-adulterated food, in compliance with food safety regulations of the U.S. Food and Drug Administration. The invention also features an apparatus which includes a plate for mounting the food item and having an interior hole extending there through, a hollow tube extending upwardly from the interior hole, the tube defining an opening through the food item and having a first open end at the interior hole and a second open end upward from the plate; a container for holding a concealed item and sized to fit within the tube; a base for holding the plate; and a release mechanism for raising the container through the second open end of the tube, the release mechanism extending from the base to the container through the first open end.

Reference will now be made in detail to the present exemplary embodiments, examples of which are illustrated in the accompanying drawings. Wherever possible, the same or similar reference numbers will be used throughout the drawings to refer to the same or like parts.

FIG. 1 is a partly exploded view of one embodiment of an apparatus for delivering a concealed item such as a hidden gift to a recipient inside a cake or other food item. As shown in FIG. 1, the apparatus may have a plate 710 for mounting the food item. The plate 710 may be circular as shown, or it may be any suitable shape, to be selected by the designer. The plate 710 has an interior hole extending through the plate (not shown), and a hollow tube 714 extends upwardly from the interior hole. The tube 714, defining an opening through the food item (not shown), may be cylindrical as shown in FIG. 1, or it may be any suitable shape, to be selected by the designer. In addition, the tube 714 may be integral with the plate, or it may be removable from the plate to facilitate food preparations, assembly, cleaning, and storage.

The assembly may have a container 130 for holding a concealed item and sized to fit within the tube 714, a base 740, and a release mechanism 910 for raising the container 130 up and out of the food item as shown and described in any of the examples and embodiments herein. The base 740 may be cylindrical as shown in FIG. 1, or it may be any suitable shape or connected to a larger display footprint or the like. The release mechanism 910 has components, described in further detail below that may extend, or be adjacent, from the base 740 to the container 130.

The plate foundation 700 may be supported by base 740, including any of the base elements, securement features, and examples shown and described herein. The base 740 generally supports an elongated central tube 714 extending from the base 740. A repositionable platform 710 is semi-affixed to the central tube 714 at any height to correspond with any dimensions, including but not limited to height, of the items shown and described herein. As illustrated in FIG. 1, the platform 710 is spaced at a variable length 714' on central tube to provide sufficient height for an item, including any cake height as understood by those skilled in the art having the benefit of this disclosure. A collar may secure the arrangements in any of these alignment options, including, but not limited to, a variety of height alignment options. The collar may include a lower portion to surround the central tube 714 and an upper portion to engage the platform 710 at an alignment position 722. The platform 710 may be of any size and shape as shown and described herein, including, but not limited to, disk-shaped to correspond with a substantially rounded food item.

Figure 9:
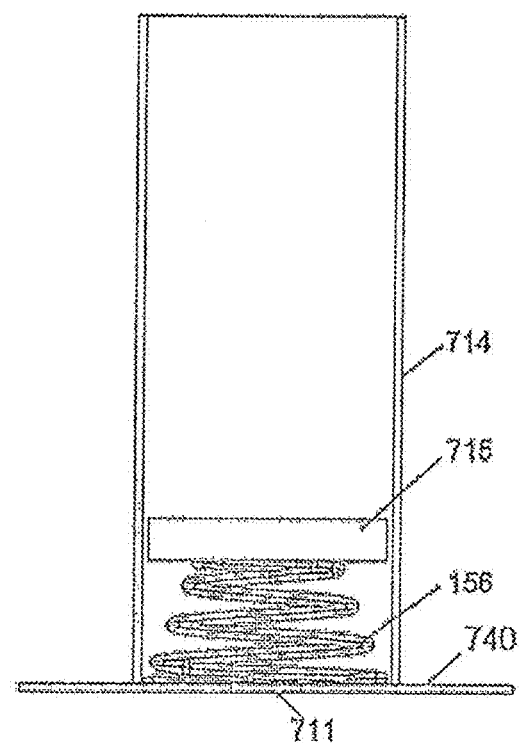
FIG. 9 is a cross-section view of an embodiment of a plate foundation for mating into the apparatus introduced in FIG. 1.

As shown in FIG. 9, the plate foundation may include a repositionable platform 715 to protrude along a portion, including the entire length, of the central tube to provide any of the delivery operations shown and described herein. As illustrated, an aperture 711 in the base 750 provides an air supply to flow between and around platform 715 and spring 156. Applicants have discovered unexpected advantages of providing an air supply through aperture 711 to increase speed and acceleration of platform 715 to produce any of the delivery methods and embodiments shown and described herein. For instance, the spatial arrangement of the platform 715 adjacent, i.e. within, adjacent, below, above, or similar, to the food item may benefit from increased speed and acceleration for proper and/or reliable delivery. Further, any of the aperture 711 examples herein may be controlled, including but not limited to mechanical closures and the like, to limit the size of the aperture 711, for instance the diameter or other dimension of the aperture 711. Those skilled in the art having the benefit of this disclosure will recognize additional aperture and base orientations and arrangements.

Figure 2:
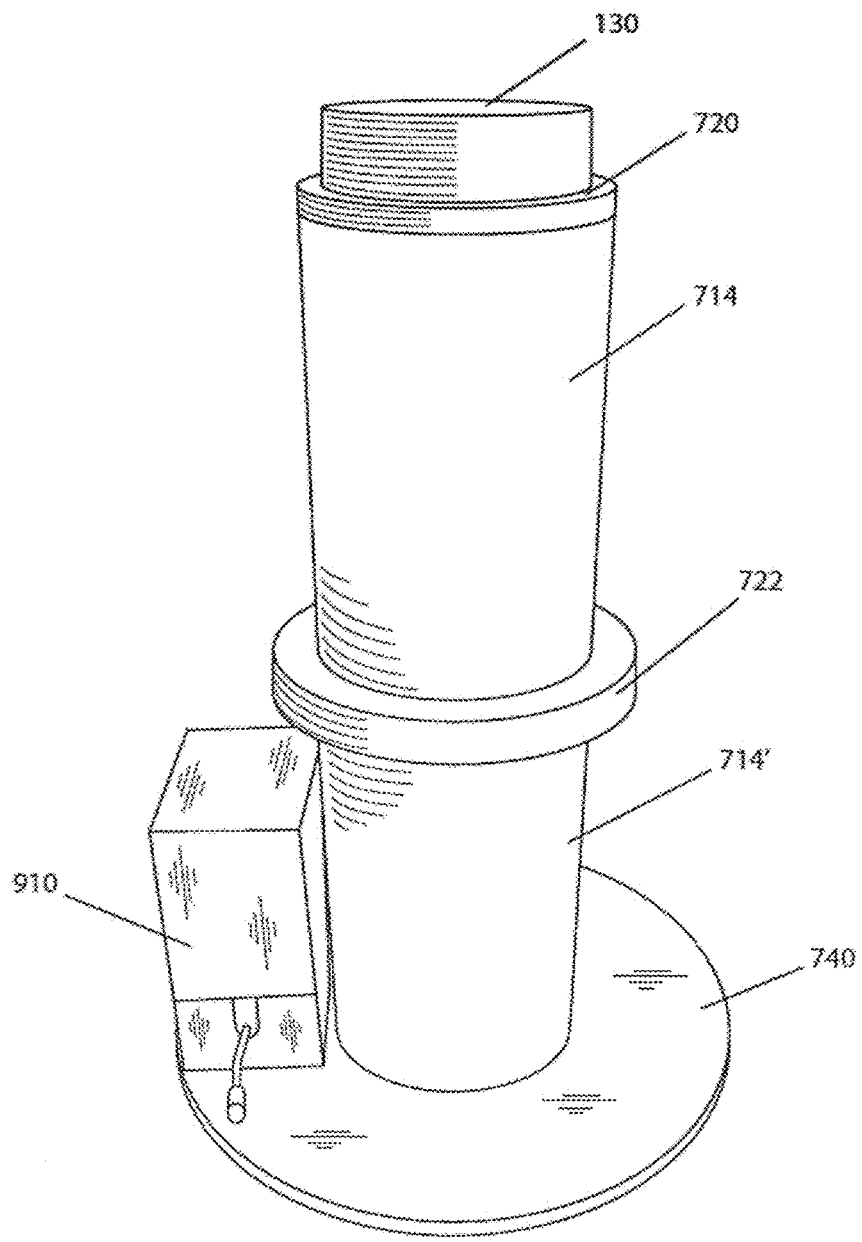
FIG. 2 is a side perspective view of an embodiment introduced in FIG. 1.
Figure 2A:
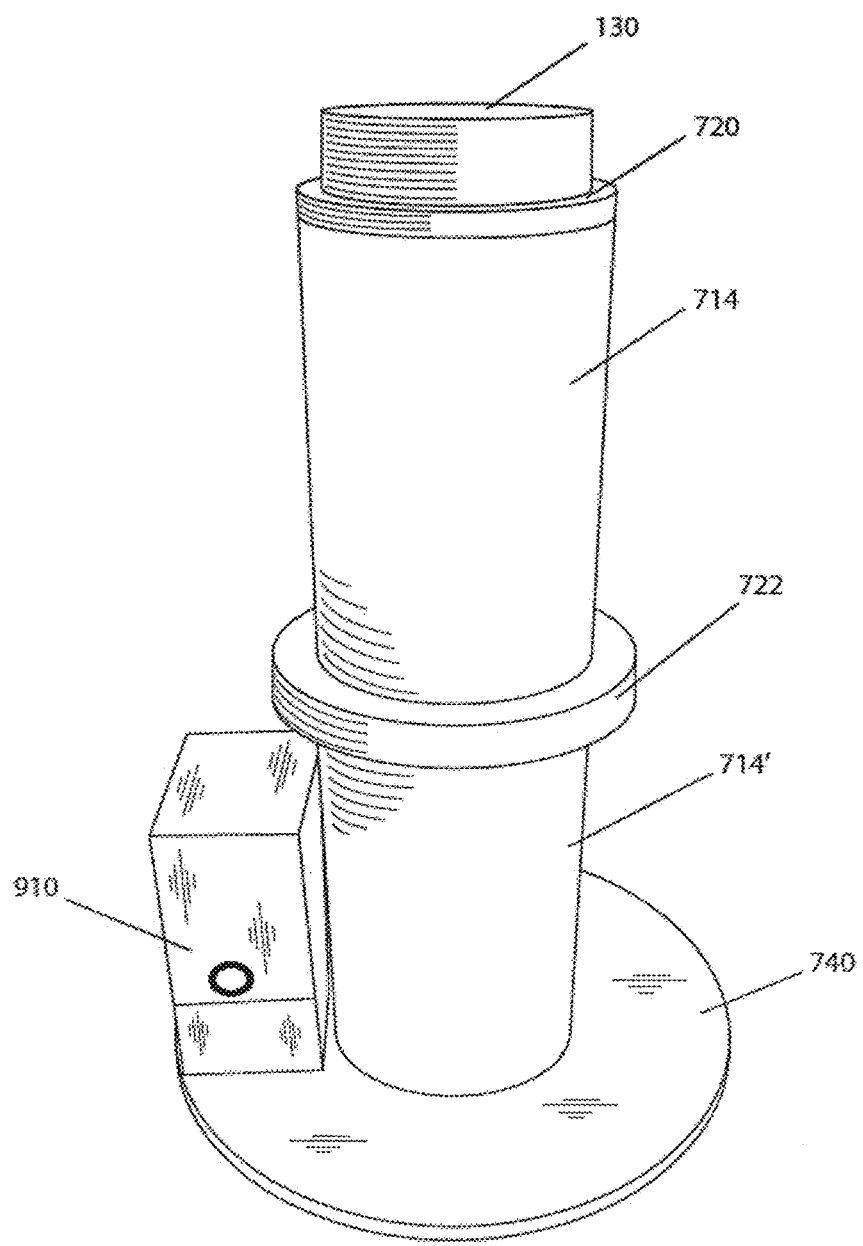
FIG. 2*a* is a side perspective view of an alternative embodiment of the apparatus introduced in FIG. 1.
Figure 3:
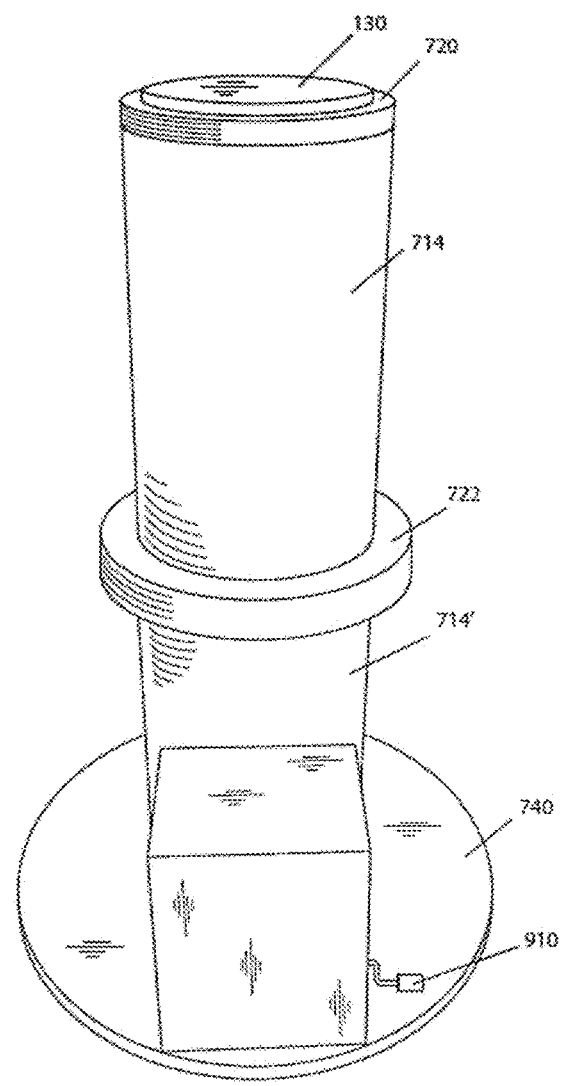
FIG. 3 is a perspective view of an embodiment of the apparatus introduced in FIG. 1 with a container in an engaged position.
Figure 4:
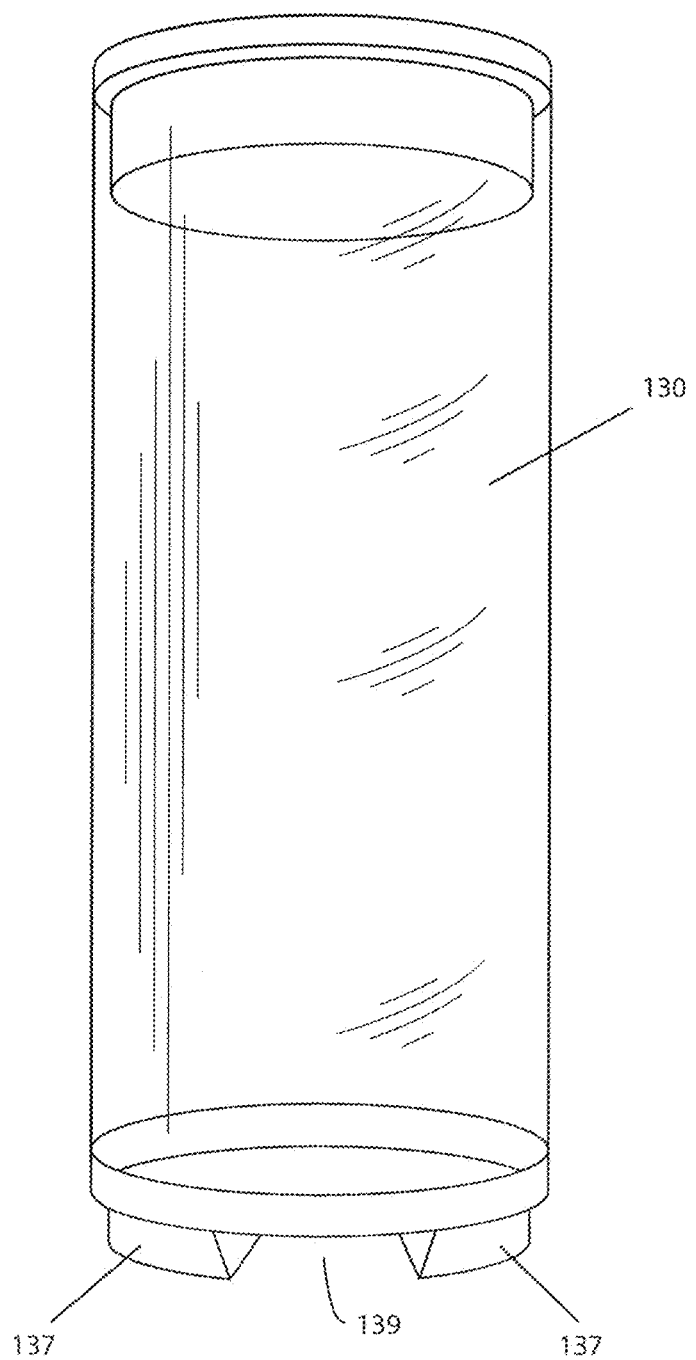
FIG. 4 is a side perspective view of an isolated container embodiment introduced in FIG. 1.
Figure 4A:
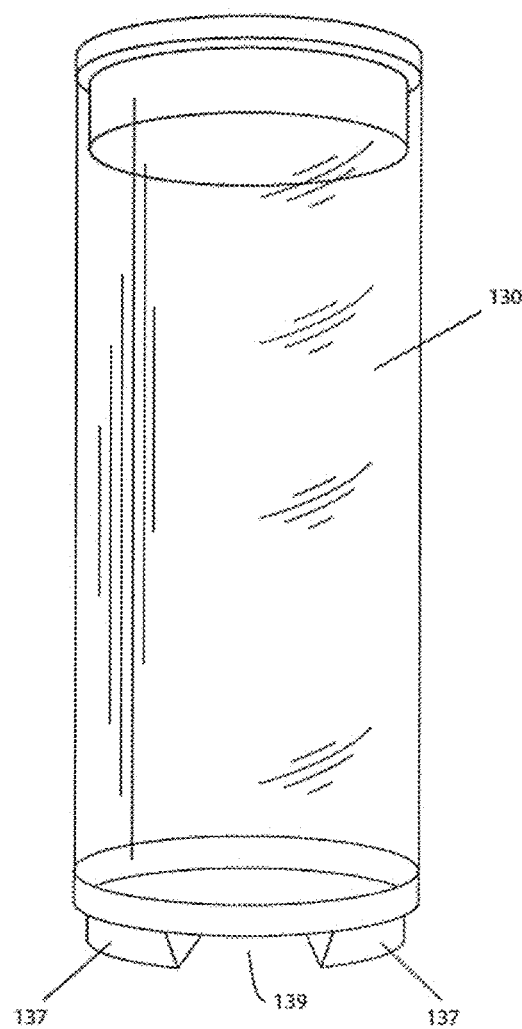
FIG. 4*a* is a side perspective view of an isolated container alternative embodiment introduced in FIG. 1.
Figure 5:
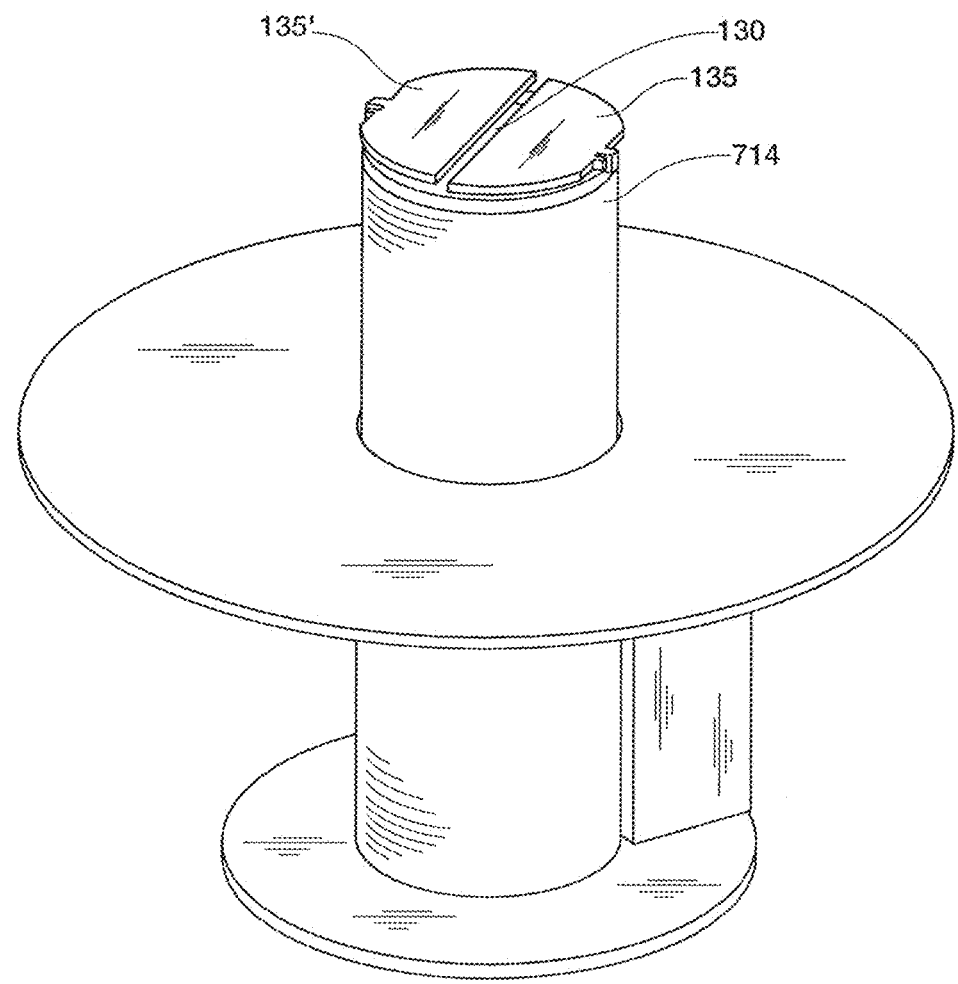
FIG. 5 is a side perspective view of an embodiment of the apparatus introduced in FIG. 1 with protective windows.

FIGS. 1-3 introduce an embodiment of a plate foundation to deliver a concealed article about a food item. As shown in FIG. 1, the plate foundation includes a base 740 supporting a release mechanism 910 and an extending central tube 714, 714'. A container 130 may generally support any of the concealed articles shown and described herein, for instance into an engaged position. A securement device 722 and foundation base 710 support any of the structural elements and food items in any of the orientations and arrangements herein, i.e. including any of the variable height positioning and the like. FIG. 2 illustrates one example of a music box winding handle in the release mechanism 910, while FIG. 2a introduces a push button release. Those skilled in the art having the benefit of this disclosure will recognize additional release mechanism 910 operations and structures to provide the features herein. FIG. 4 introduces one example of a container 130 with a magnet 141 to mate with an opposing magnet on the plate foundation, while FIG. 4a introduces another container attachment assembly having a pair of opposing rail members 137 aligned between aperture 139 to mate with opposing receiving members on the plate foundation. Again, those skilled in the art having the benefit of this disclosure will recognize additional container 130 to plate foundation attachment configurations, and the like, to provide any of the features and advantages shown and described herein. FIG. 5 introduces on example of releasable windows 135, 135' hingedly connected to the exposed open end of central tube 714 to limit, or eliminate, frosting and other food materials, from entering the central tube 714 during preparation and/or operation. Other examples include alternative windows, closures, and the like to protect internal elements.

Figure 6:
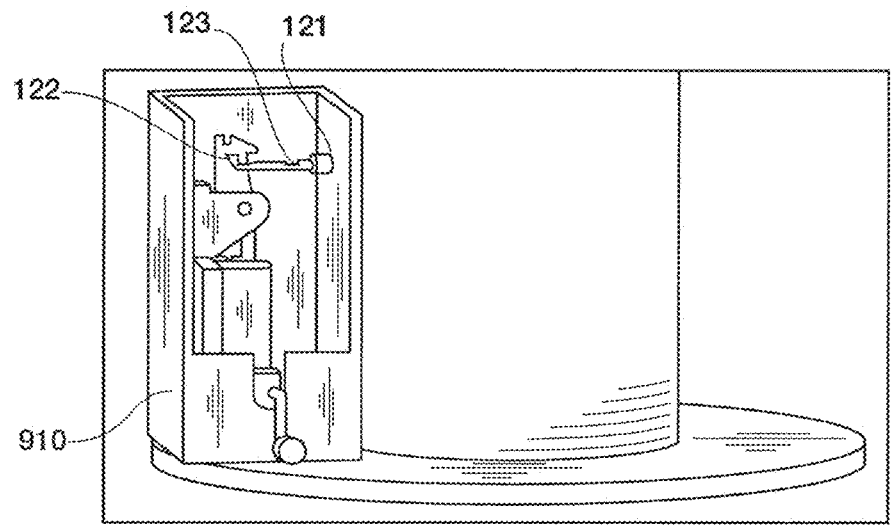
FIG. 6 is a side perspective view of a spring release mechanism with elements removed to illustrate internal elements according to one embodiment of the disclosure.
Figure 6A:
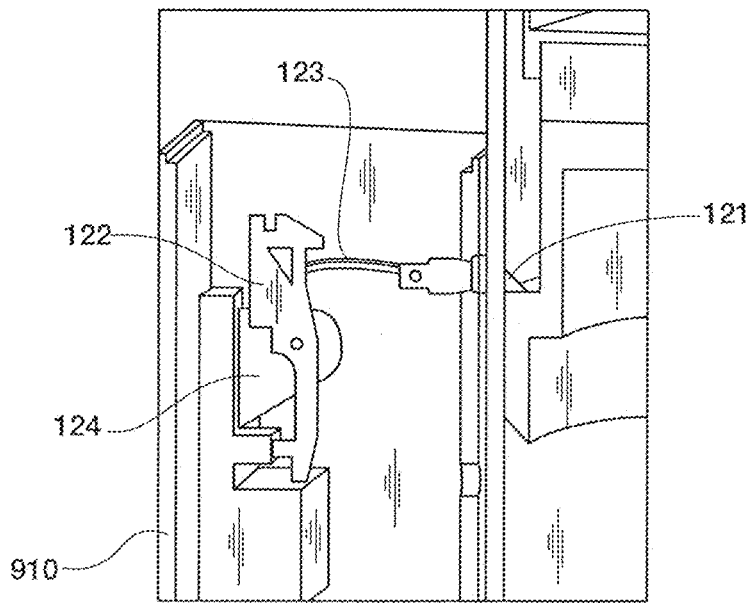
FIG. 6*a* is a cross-section view of the spring release mechanism embodiment introduced in FIG. 6.
Figure 6B:
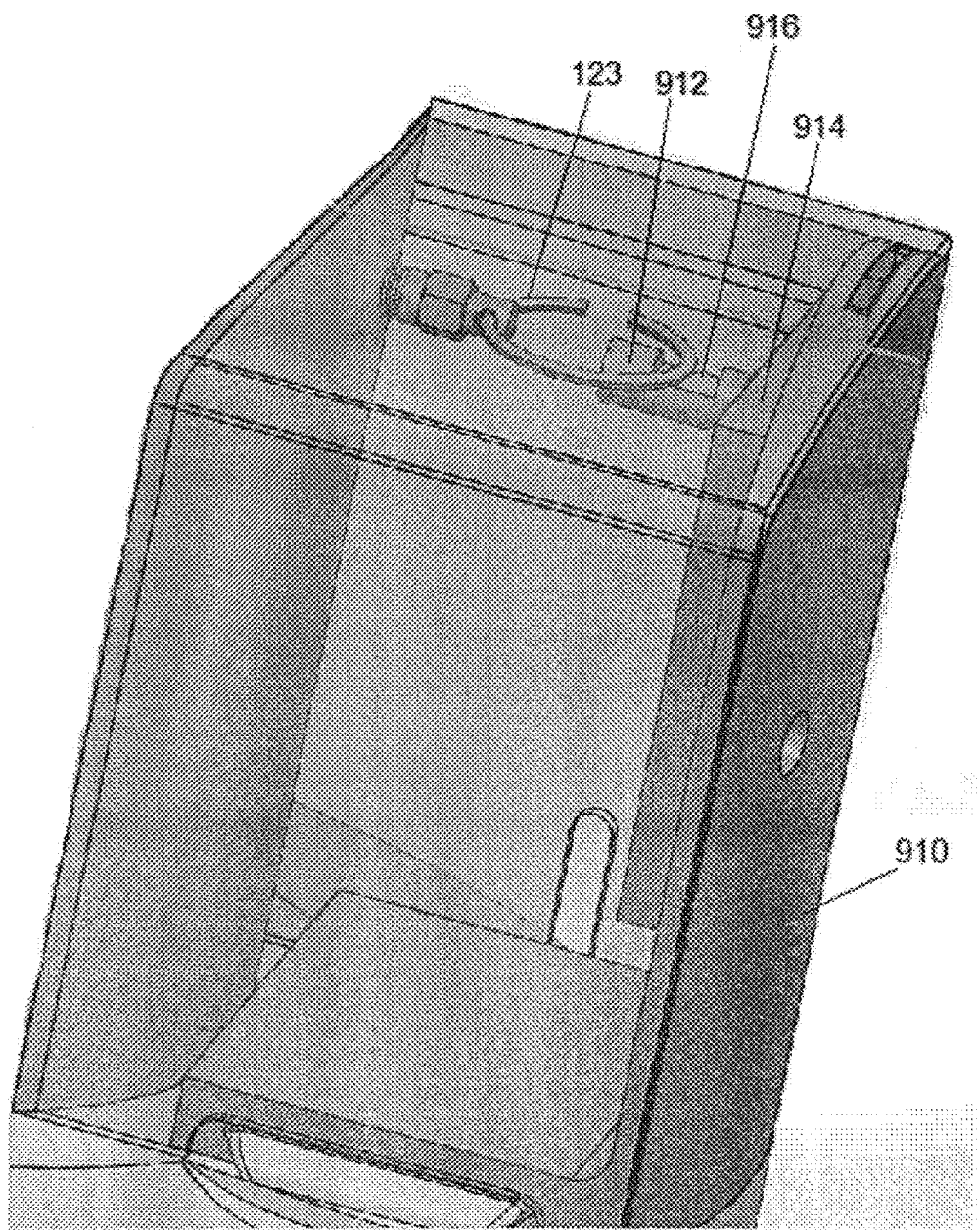
FIG. 6*b* is a side perspective view of an alternative release mechanism with elements removed to illustrate internal elements according to one embodiment of the disclosure.

FIGS. 6 and 6a introduce one embodiment of a spring release mechanism 910 to deliver any container as shown and described herein. As illustrated, the release mechanism 910 may be a music box design style mechanism for releasing the container. Applicant has unexpectedly discovered traditional spring pressure from a music box mechanism exerts damaging, excessive force, causing unreliable releasing and/or injury to internal elements and/or frame support 124. Therefore, Applicant has introduced a release mechanism assembly that includes a retractable spring plunger 121 secured about the rotating shaft box mechanism 122 to withstand said pressures and challenges. The retractable spring plunger 121 nose may have a chamfered edge, so that when the container 130 is retracted the platform will retract the nose of the retractable spring plunger 121 after contact with the chamfered edge. Additionally, a linkage may connect the retractable spring plunger 121 about the rotating shaft box mechanism 122, for instance a split key ring 123 shown in FIGS. 6 and 6a connects the retractable spring plunger 121 about the rotating shaft box mechanism 122. Those skilled in the art having the benefit of this disclosure will recognize additional plunger and/or connection arrangements and orientations. In certain embodiments, the release mechanism includes an electronic assembly to release the container 130 as shown and described herein. For instance, an electronic release mechanism may release the spring plunger for operation. As illustrated in FIG. 6B, an electronic toggle linkage 912 between the electronic assembly 914 and plunger operatively releases the container as shown and described herein. The electronic toggle linkage 912 may include a connection indent 916, for instance to mate with the ring 123, or the like. The electronic release mechanism 910 may be remotely controlled independent of contact with the assembly, for instance to facilitate operation without direct contact. Further embodiments include a variety of user interfaces, including any type or remote access input, mobile device application, and similar operational connection.

A further embodiment includes any of the plate foundation 700 elements herein in combination with a board member that supports a plurality, including two or more, food items. For instance, the board member may include a securement fastener to fasten at least one food item to provide any of the delivery and presentation operations shown and described herein. The securement fastener may include an adhesive, a hook, a J-hook, a magnet, a linkage, combination thereof, and the like. Those skilled in the art having the benefit of this disclosure will recognize additional securement fastener examples and arrangements.

Generally, the side walls of the gift pod container 130 are derived form a tube shape and the bottom of the container is formed from the upper surface of supper spring seat 152. The top of the gift pod may be derived from cover 120. In operation, a user may place the gift into the container, and push the container 130 into the assembly.

In certain embodiments, the container 130 may have an inner compartment for holding the concealed item. For instance, the concealed item may rest on the top surface of the upper spring seat, which has a ridge around its outer perimeter to receive the walls of the container 130. In certain other embodiments, the compartment may have a floor on which the concealed item rests. Further, an actuator may have elements for holding a spring in its compressed state and for releasing the spring and thereby releasing the container 130 from the tube. The actuator may have an outer element extending through a surface of the base to receive operative actions by a user. Actuator may also have a securing element that is extendable into and across the upper spring seat, for instance through a first hole, which is disposed in the wall of the bottom spring seat, and a second hole, which is disposed in the wall of the upper spring seat. In certain examples, the holes form a passageway across the upper spring seat to hold the spring in a compressed state. Also, the wall of the bottom spring seat may have an internal ridge around its inner perimeter to receive the walls of the upper spring seat.

Figure 10:
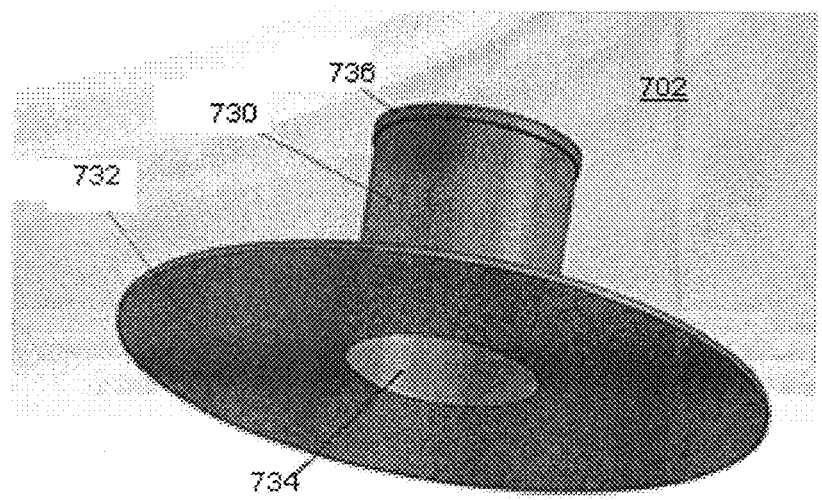
FIG. 10 is a perspective view of an embodiment of an assembly board for mating into the apparatus introduced in FIG. 1.
Figure 11:
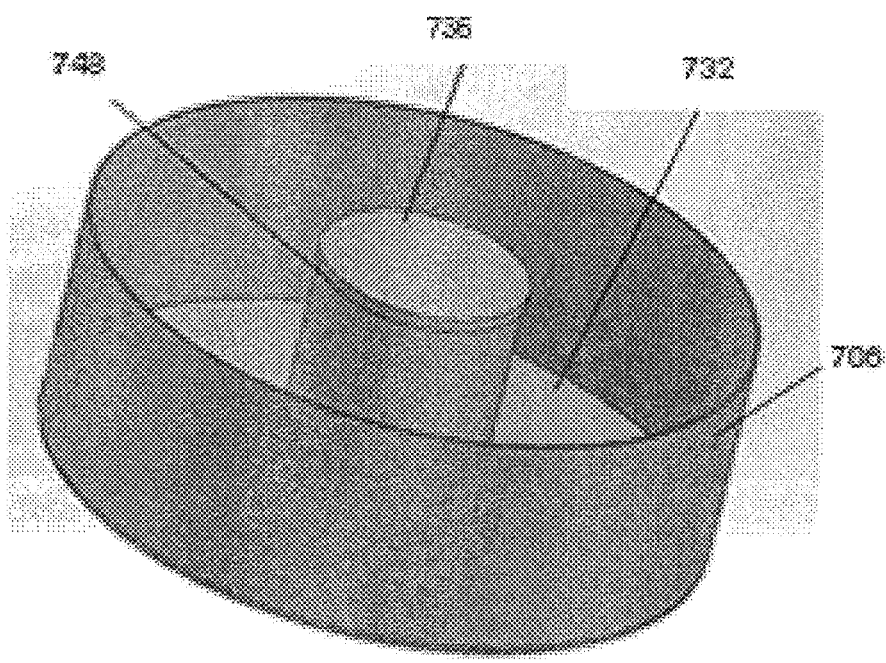
FIG. 11 is a perspective view of an embodiment of the assembly board introduced in FIG. 10 with an outer baking wall.

As shown in FIGS. 10 and 11, the board assembly may include a substantially flat board member 732, or any other shape and arrangement, to support a food item(s). An interior hole 734 is positioned within the board member 732 with an elongated housing 730 extending therefrom to support any of the arrangements and embodiments shown and described herein. The upper portion of the elongated housing 730 may include a removable cap 736, for instance at a detachment point 748 as later shown in FIG. 11. In use, the board assembly 702 may allow access to the item, for instance frosting a food item, outside of the plate foundation. The board assembly 702 may also allow convenient manipulation, transportation, and the like of the item to the plate foundation. As additionally shown in FIG. 11, the board assembly 702 may be transformed into a baking mold having an exterior wall 706. As shown, the exterior wall 706 is a baking cylinder, but those skilled in the art having the benefit of this disclosure will recognize additional shapes and designs. In use, the exterior wall 706 may be installed for baking, and the like, and then be moved to mate with a plate or foundation in any of the embodiments and examples shown herein.

In certain embodiments, the upper spring seat has a third hole and the bottom spring seat has a fourth hole, both of which match up with holes to further define a passageway across the upper spring seat. These elements may be pivotally attached to either end of a connector, which itself is pivotally attached to base through connector pin. In certain embodiments, the outer element is a rod extending through a base hole in the surface of the base to receive hold and release operative actions by a user. The securing element may also be a rod that is extendable into and across the passageway. In operation of these alternative embodiments, a user may push the container/upper spring seat assembly into the internal ridge to house the spring in bottom spring seat. While applying downward pressure on the container/upper spring seat assembly (so as to avoid spring decompression), the user may align the holes to form the passageway, and then pull the actuator outer element through actuator hole a selected distance from the base. In addition, certain embodiments may provide hole alignment guides on the seats to facilitate alignment. A pulling action on the actuator outer element may cause the connector to pivotally push the actuator securing element through the holes, thus holding the container/upper spring seat assembly securely into the base and holding the spring compressed in the bottom spring seat.

In certain embodiments, the food item may be prepared on the base in which the container/upper spring seat assembly is secured. In other embodiments, the food item may be prepared separately and mounted on, or even secured to, the base. Further, the food item optionally includes multiple layers of food item, e.g., of a tiered cake, each such layer having a central food interior hole to, when aligned, accommodate the tube when assembled onto the plate. The tube cover may be applied over the tube to releasably cover the second open end of the tube and to hide the concealed item, and to support any icing or decorative ornament used to decorate food item. In certain embodiments, the tube cover may still be visible after the cake is iced and decorated. In other embodiments, the tube cover may be iced and decorated to cover the tube cover so that the existence of the concealed item remains a surprise.

In certain embodiments, the food item/plate assembly may be temporarily secured to the container/base assembly using any suitable conventional means to prevent accidental slippage. In other embodiments, the food item/plate assembly simply rests on the container/base assembly. In alternative embodiments, the bottom of gift pod container is an integral molded part of the container, or can be pre-attached prior to assembly into the apparatus. A cover of gift pod container may be alternatively placed into position on top of gift pod container prior to assembly of apparatus, or can be placed on top of food item/stand assembly in the same manner by which a cover is applied as shown and described herein.

Figure 7:
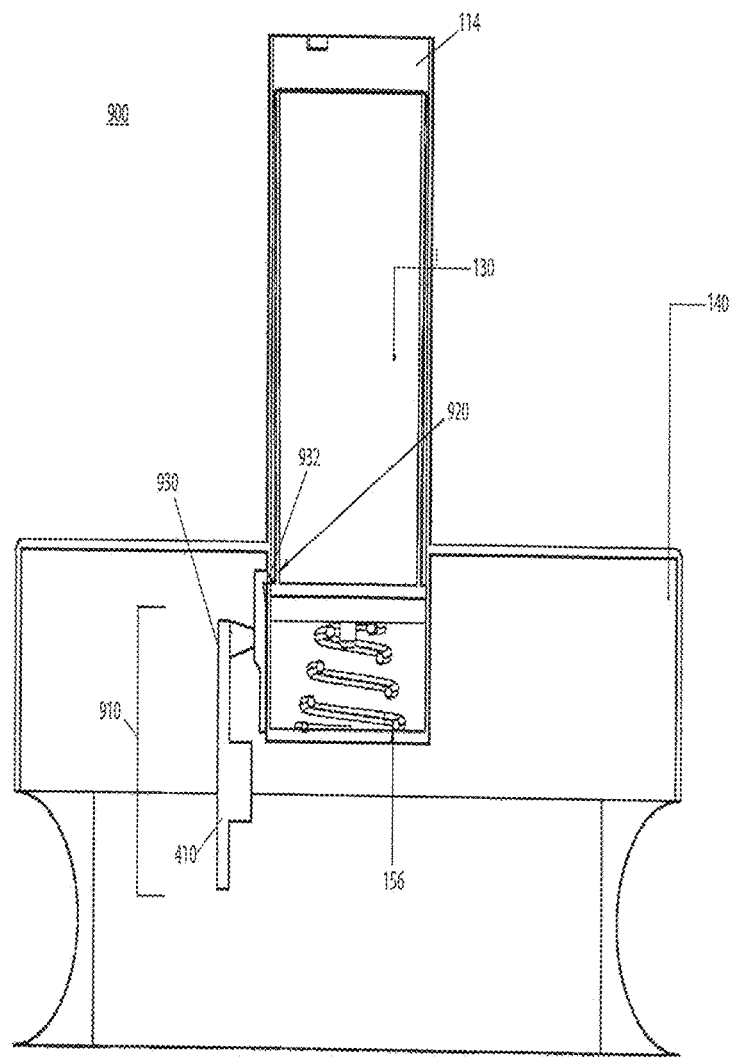
FIG. 7 is a cross-section view of a release mechanism embodiment for delivering a concealed item, with items removed for clarity.
Figure 8:
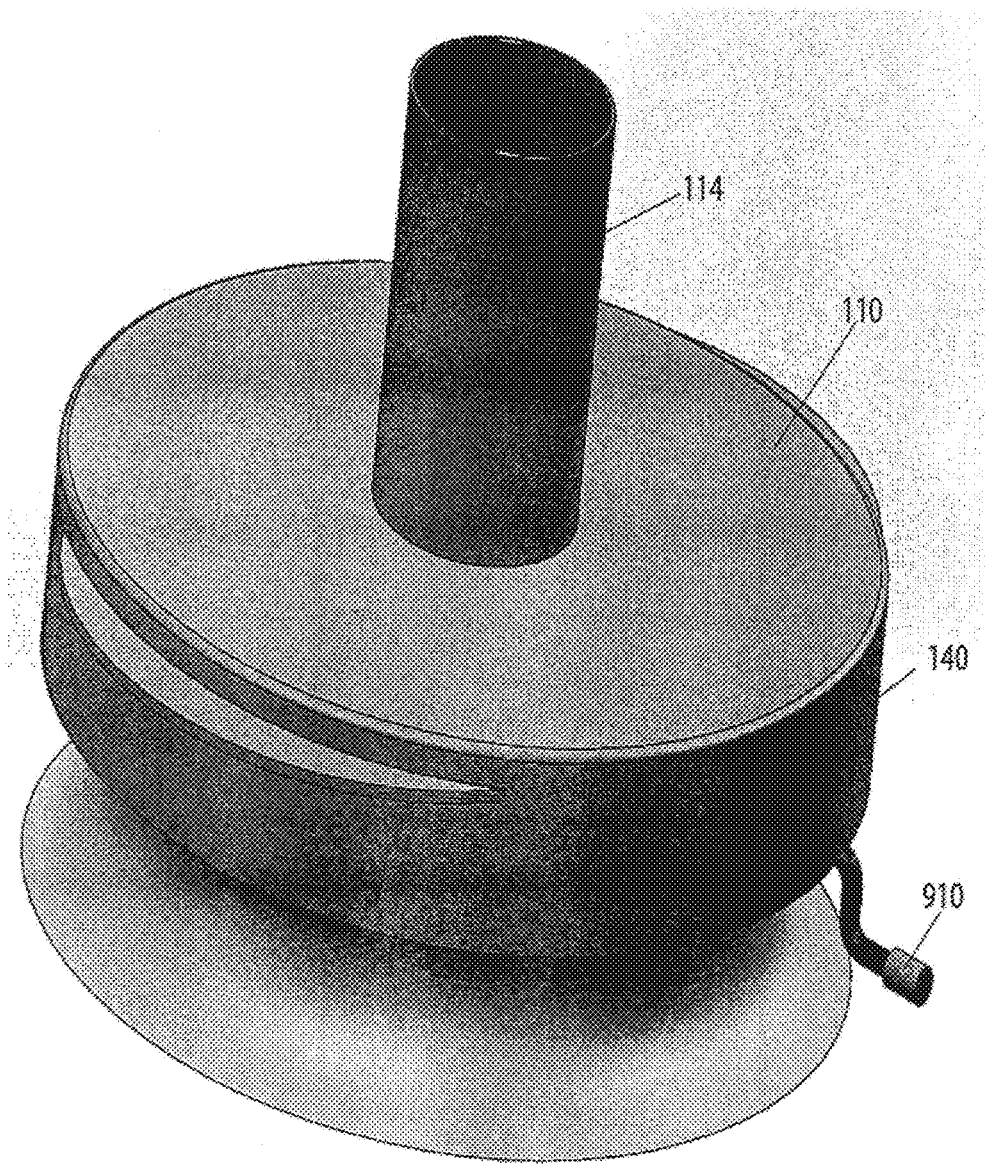
FIG. 8 is a perspective assembly view of the apparatus of FIG. 7.

Other embodiments include various release mechanisms, actuators, and the like for delivering the concealed item inside a cake or other food item. FIGS. 7 and 8 show one embodiment of a jack-in-the-box style release mechanism 900, however those skilled in the art having the benefit of this disclosure will recognize additional mechanical trigger, pneumatic, and release mechanisms. As shown, the release mechanism includes an actuator assembly 910 biased upward from a compression spring body 156, for instance a tapered spring, held in a fixed position by a catch and then releases the container 130 when unlatched about release point 920. Applicant has unexpectantly discovered the tapered spring, including a conical shape and the like, allows significantly larger sized containers 130 to efficiently traverse the system as shown and described herein than would otherwise be functional with a traditional spring.

Particular examples of the release mechanism include a vertical member 930 and a perpendicular horizontal member 932 removably caught against the assembly as illustrated in FIG. 7. As shown, the spring 156 may be compressed when pushed into the assembly and expanded via a crank handle outer element, or the like, to release container 130 through the passageway. In certain examples, the release mechanism 910 provides a slow-release, warning, including but not limited to sound, lights, etc., before presenting the container 130. In particular examples, the release mechanism 910 protrudes through the base 140, while other release mechanism 910 examples protrude though the plate 110 or other supporting platform to provide a variety of configurations to compliment the cake or other food item arrangement. The outer element of the release mechanism may include a variety of members, including hand cranks 910, supporting linkages, and the like.

The food item/stand assembly may be employed in a method for delivering an article to a recipient inside a food item. The method has a staging process, for instance when the article is concealed in a tube inside a food item on a stand. Next, the article is releasably held within the tube; and in an operation stage, a force is applied to the stand to simultaneously release the hold on the article and move the article through the tube to an upper surface of the food item. Depending on the characteristics of the release mechanism/process, including any of the release mechanism examples and embodiments herein, the force may be sufficient to eject the article from the food item.

The food item/stand assembly may also be employed in a method for gifting. The method may employ the stages of the various methods, namely concealing the gift in a tube inside a food item on a stand; releasably holding the gift within the tube; and applying a force to the stand to simultaneously release the hold on the gift and move the gift through the tube to an upper surface of the food item. In a stage, the food item on its stand may be presented to a gift recipient.

The food item/stand assembly may also be employed in a method for preparing a food item. The method may employ the stages of the method, namely concealing an article in a tube inside the food item on a stand; and releasably holding the article within the tube. In a stage, preparation(s) (such as decorating, organizing, or assembling) may be conducted on the food item on its stand. A further stage may be employed to apply a force, for example through a compressed spring, to the stand to release and move the gift through the tube to an upper surface of the food item.

One skilled in the art will appreciate that, although the embodiments disclosed herein are described in the context of a food serving system, the food item may be prepared on the serving system. For example, a cake being served on the plate of the serving system may also be decorated thereon. In addition, although the embodiments disclosed herein are described in the context of a system for serving food, the system may be used presenting other non-food-items. For example, the pate of the system may also be used to present small gift items or the like.

One of ordinary skill in the art will further recognize that functions provided by one or more components of any of the disclosed systems may be divided into additional components, or combined or incorporated into another component shown in the Figures. As one of ordinary skill in the art will appreciate, one or more of units may be optional and may be omitted from implementations in certain embodiments.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A system to deliver a concealed article about a food item, said system comprising:
    a. a container adapted to support said concealed article in an engaged position;
    b. a central tube having a lower portion and an exposed end, wherein said container traverses at least a portion of said central tube; and
    c. a release mechanism adapted to release said container from said central tube and whereby said container protrudes through said exposed end, and
        wherein said container delivers said concealed article from an isolated position about said food item to an adjacent substantially external position.

2. The system of claim 1, wherein said release mechanism includes an automatic trigger adapted to release said container about said central tube.

3. The system of claim 2, further including an electronic toggle linkage retractable about an extension plunger.

4. The system of claim 1, wherein said release mechanism comprises a chamfered edge plunger.

5. The system of claim 1, including a board assembly.

6. The system of claim 5, wherein said board assembly includes a top face adapted to receive said food item.

7. An apparatus for delivery of a concealed article through an item, said apparatus comprising:
    a. a container adapted to support said concealed article in an engaged position;
    b. a central tube having a lower portion and an exposed end, wherein said container traverses at least a portion of said central tube; and
    c. an automatic release mechanism adapted to release said container from said central tube and whereby said container protrudes through said exposed end, and
        wherein said container delivers said concealed article from an isolated position about said food item to an adjacent substantially external position.

8. The apparatus of claim 7, wherein said release mechanism includes an electronic toggle linkage retractable about an extension plunger.

9. The apparatus of claim 7, wherein said release mechanism includes a retractable spring plunger and a rotating shaft box.

10. The apparatus of claim 9, wherein a split key ring connects said retractable spring plunger about said rotating shaft box.

11. The apparatus of claim 7, including a board assembly.

12. The apparatus of claim 11, wherein said board assembly includes a top face adapted to receive said item and an interior hole about said central tube.

13. The apparatus of claim 11, wherein said board assembly comprising a removable exterior wall.

14. An assembly to deliver a concealed article about a food item, said assembly comprising:
    a. a container adapted to support said concealed article in an engaged position;
    b. a central tube having a lower portion and an exposed end, wherein said container traverses at least a portion of said central tube;
    c. a release mechanism adapted to release said container from said central tube and whereby said container protrudes through said exposed end; and
    d. a board assembly having a top face adapted to receive said food item and an interior hole about said central tube, and
        wherein said container delivers said concealed article from an isolated position about said food item to an adjacent substantially external position.

15. The assembly of claim 14, wherein said release mechanism includes an automatic trigger adapted to release said container about said central tube.

16. The apparatus of claim 15, wherein said release mechanism includes a retractable spring plunger and a rotating shaft box.

17. The assembly of claim 14, wherein said board assembly having a housing extending from said interior hole.

18. The assembly of claim 14, further including a foundation base.

19. The assembly of claim 14, including a securement device adapted for multi-height positioning.

20. The assembly of claim 19, including a food item.

* * * * *